United States Patent
Marrs

(10) Patent No.: US 6,422,764 B1
(45) Date of Patent: Jul. 23, 2002

(54) CLAMPING MECHANISM FOR AN OPTICAL FIBER

(75) Inventor: Samuel M. Marrs, Bradley, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/516,675

(22) Filed: Mar. 1, 2000

(51) Int. Cl.$^7$ .............................................. G02B 6/36
(52) U.S. Cl. ........................ 385/81; 385/83; 385/139; 385/137
(58) Field of Search ........................... 385/76–78, 81, 385/83, 87, 139, 137

(56) References Cited

U.S. PATENT DOCUMENTS

| | | | |
|---|---|---|---|
| 4,030,809 A | 6/1977 | Onishi et al. | 385/71 |
| 4,178,067 A | 12/1979 | Johnson et al. | 385/95 |
| 4,257,674 A | 3/1981 | Griffin et al. | 385/70 |
| 4,336,977 A | 6/1982 | Monaghan et al. | 385/87 |
| 4,418,983 A | 12/1983 | Bowen et al. | 385/69 |
| 4,435,038 A | 3/1984 | Soes et al. | 385/70 |
| 4,447,121 A | 5/1984 | Cooper et al. | 385/87 |
| 4,593,972 A | 6/1986 | Gibson | 385/70 |
| 4,729,619 A | 3/1988 | Blomgren | 385/70 |
| 4,743,084 A | 5/1988 | Manning | 385/84 |
| 4,842,363 A | 6/1989 | Margolin et al. | 385/84 |
| 4,877,303 A | 10/1989 | Caldwell et al. | 385/55 |
| 5,179,608 A | 1/1993 | Ziebol et al. | 385/81 |
| 5,222,169 A | 6/1993 | Chang et al. | 385/87 |
| 5,337,390 A | 8/1994 | Henson et al. | 385/81 |
| 5,394,496 A | 2/1995 | Caldwell et al. | 385/70 |
| 5,469,522 A | 11/1995 | Fan | 385/98 |
| 5,519,798 A | 5/1996 | Shahid et al. | 385/65 |
| 5,857,045 A * | 1/1999 | Lee | 385/70 |
| 5,943,460 A | 8/1999 | Mead et al. | 385/81 |
| 6,022,150 A * | 2/2000 | Erdman et al. | 385/81 |
| 6,234,685 B1 * | 5/2001 | Carlisle et al. | 385/83 |

* cited by examiner

Primary Examiner—Brian Healy
Assistant Examiner—Sarah U Song
(74) Attorney, Agent, or Firm—Robert A. McCann; Jay A. Saltzman; Christopher S. Clancy

(57) ABSTRACT

A termination clamp for the optical fiber of a fiber optic cable is disclosed. The clamp includes a crimpable housing, adapted to receive first and second clamp members. The fiber extends between the clamp members and crimping of the housing secures the fiber within the termination. One clamp member includes an exit chamfer to avoid bending of the fiber during crimping.

10 Claims, 3 Drawing Sheets

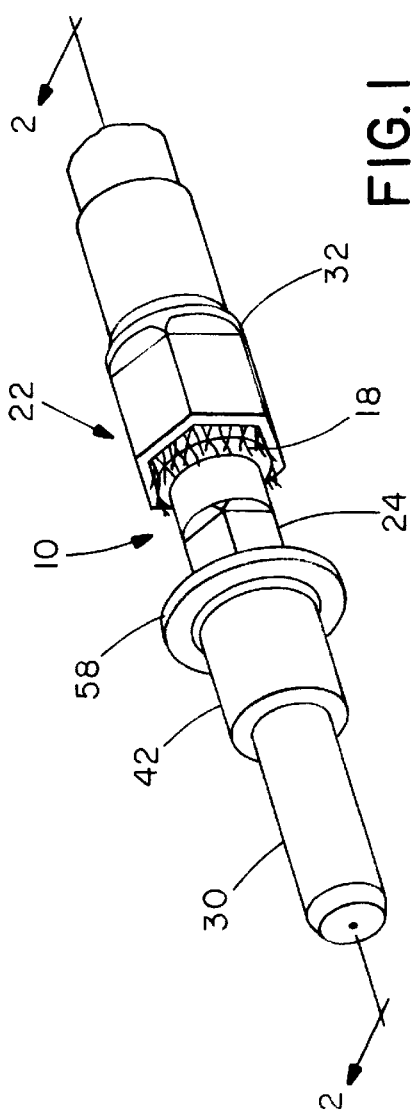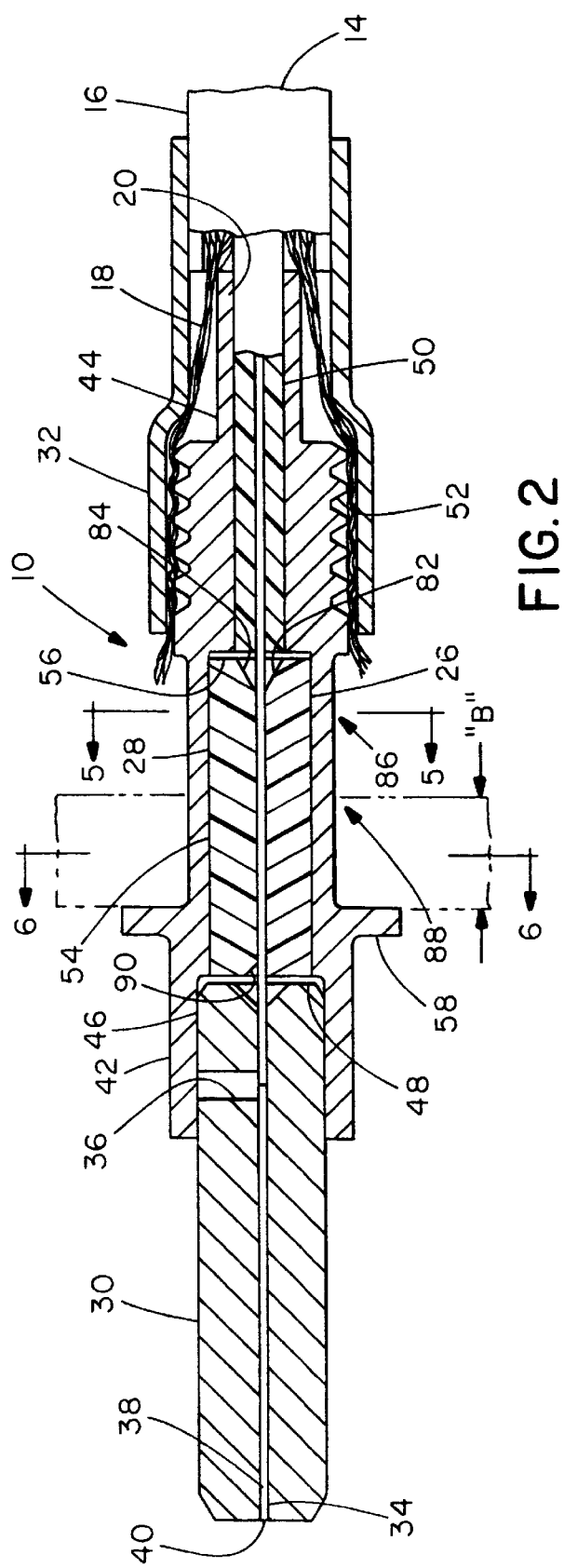

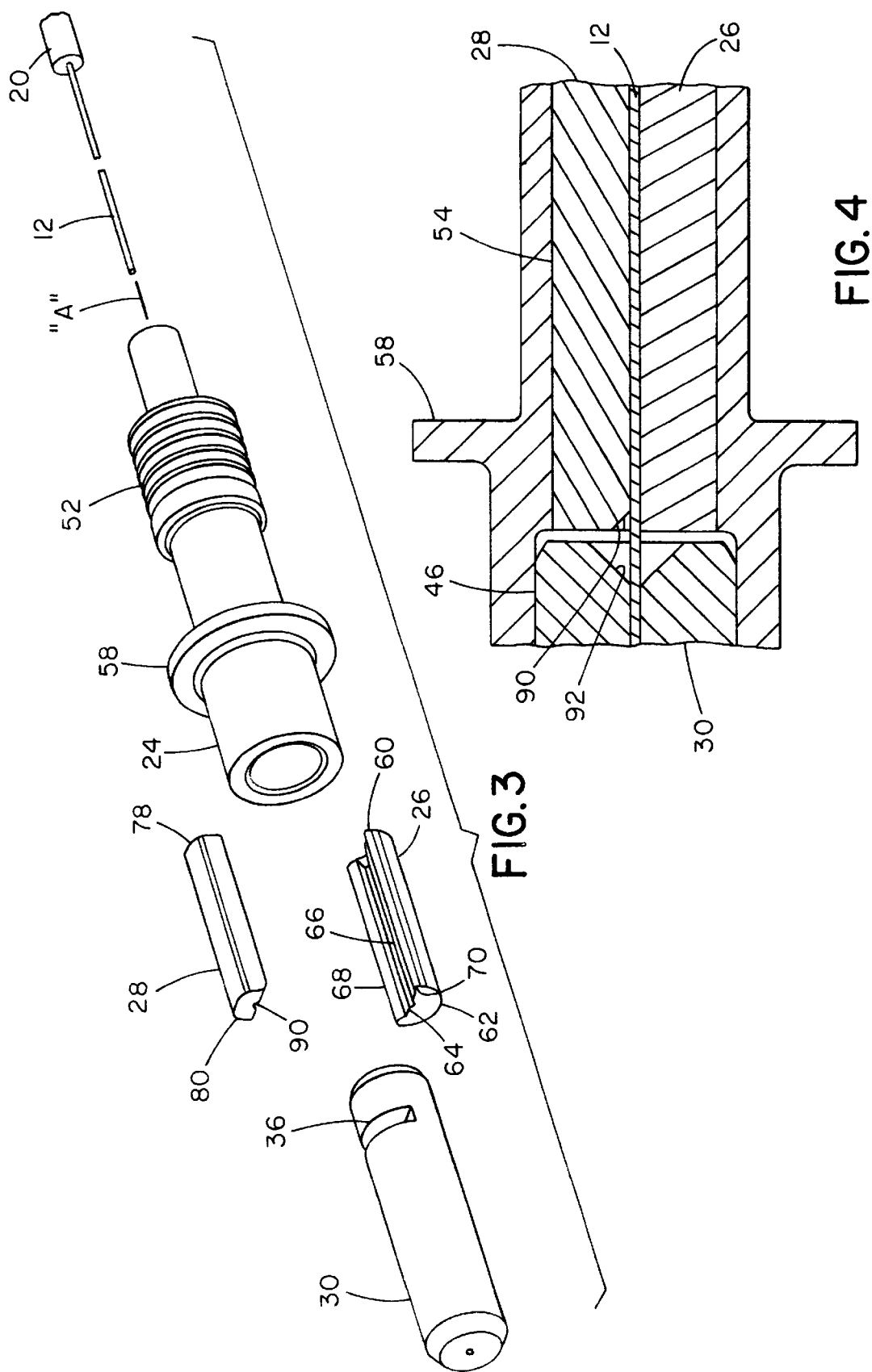

CLAMPING MECHANISM FOR AN OPTICAL FIBER

BACKGROUND OF THE INVENTION

The present invention relates generally to a fiber optic termination and more particularly to a clamp for locking the optical fiber against movement.

There are several ways to terminate a fiber optic cable, including (i) jacketed and buffered terminations and (ii) pass-through and stub terminations. In all instances, it is necessary to clamp, or frictionally retain, the optical fiber against movement within the termination. Such relative movement can cause a small "gap" in the transmission channel, with consequential loss of signal power.

SUMMARY OF THE INVENTION

In a first principal aspect, the present invention is a clamping mechanism for the optical fiber of a fiber optic cable. The mechanism includes a crimpable housing, adapted to receive first and second clamp members. The housing defines a central longitudinal axis.

The first clamp member is substantially semi-cylindrical in shape, defining a central longitudinal groove which substantially aligns with the longitudinal axis of the housing in a first or crimpable state. The first clamp member has opposed, rounded longitudinal ridges defining a clamp seat therebetween.

The housing further receives the second clamp member in the crimpable state. The second clamp member rests within the clamp seat.

The first and second clamp members cooperate to guide the optical fiber towards and along the central longitudinal groove. The optical fiber extends between and beyond the first and second clamp members, at least partially residing within the central longitudinal groove. In a crimped state, the housing urges the second clamp member towards the clamp seat, thereby "pinching" the optical fiber.

In a second principal aspect, the second clamp member includes an exit chamfer substantially opposite the central longitudinal groove of the first clamp member. Crimping of the housing exerts a bending force upon the optical fiber, which may itself cause a transmission "gap." The exit chamfer substantially negates this bending force.

It is thus an object of the present invention to provide an improved fiber optic termination. Another object is a clamp to retain the optical fiber against movement within the termination. Still another object is a fiber optic clamp that substantially avoids bending of the optical fiber during the termination process. Yet another object is an inexpensive, readily manufactured clamping mechanism for a optical fiber.

These and other features, objects and advantages of the present invention are set forth or apparent in the following detailed description.

BRIEF DESCRIPTION OF THE DRAWING

A preferred embodiment of the present invention is described herein with reference to the drawing herein:

FIG. 1 is a perspective view of a fiber optic termination, including a preferred embodiment of the present invention;

FIG. 2 is a partial cross sectional side view of the termination shown in FIG. 1, taken along 2—2;

FIG. 3 is an exploded perspective view of the termination shown in FIG. 1;

FIG. 4 is an enlarged partial cross sectional side view of the crimpable housing shown in FIG. 1, illustrating the ferrule and clamp members of the present invention;

DETAILED DESCRIPTION OF A PREFERRED EMBODIMENT

Figure 5:
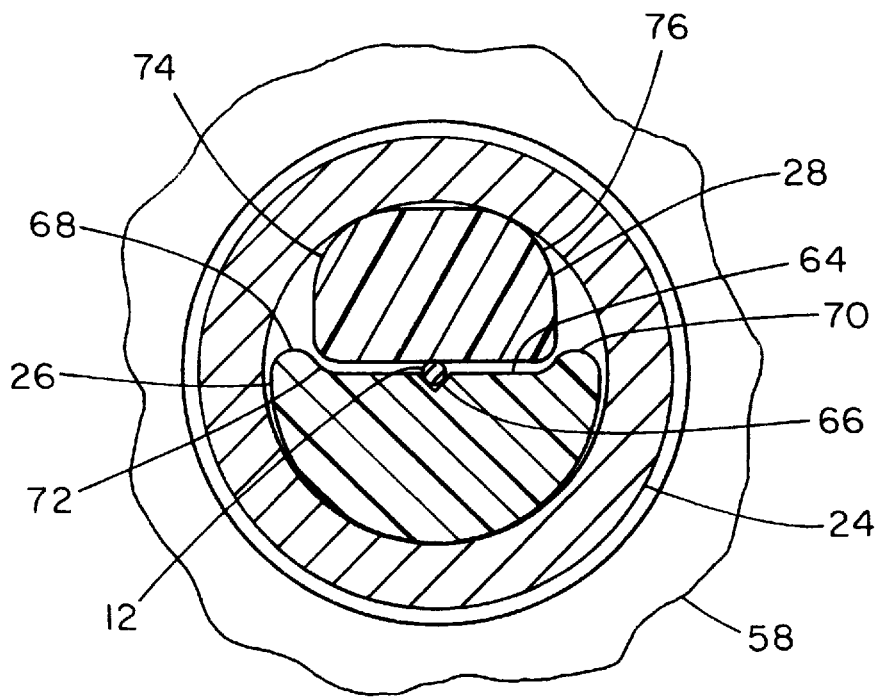
FIG. 5 is a cross-sectional end view, taken along 5—5 of FIG. 2.

A preferred embodiment of the present invention is shown in FIGS. 1–6 as a clamping mechanism, generally designated 10, for an optical fiber 12 of a conventional fiber optic cable 14. As is well known in the art, the fiber optic cable 14 includes an outer jacket 16, strengthening members 18 (typically an aramid yarn), and a buffer jacket 20. The optical fiber 12, including a core and cladding (not shown), is coated with silicone (not shown) which is removed to expose the fiber 12 prior to termination.

With reference to FIGS. 1 and 2, the clamping mechanism 10 is utilized in a jacketed stub termination, generally designated 22. The clamping mechanism 10 may also be used in a jacketed pass-through termination, a buffered stub termination and a buffered pass-through termination.

Figure 6:
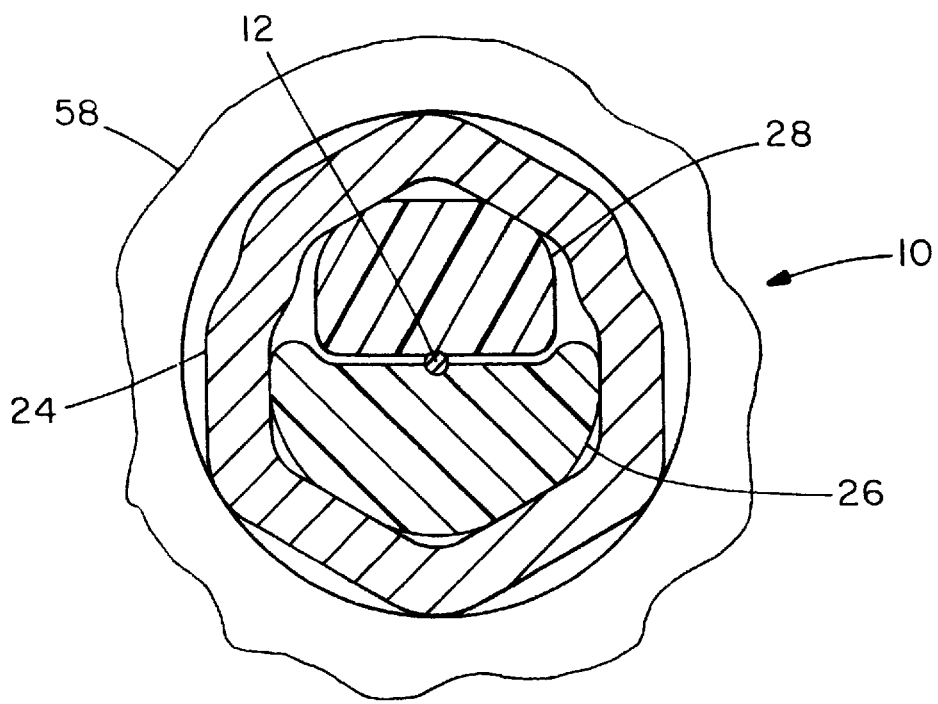
FIG. 6 is a cross-sectional end view, taken along 6—6 of FIG. 2.

The clamping mechanism 10 has a crimpable state, as best shown in FIG. 2, and a crimped state, as best shown in FIG. 6. The clamping mechanism 10 and termination 22 are assembled in the crimpable state and operative to clamp the optical fiber 12 in the crimped state. The mechanism 10 includes a crimpable housing 24, a first clamp member 26 and a second clamp member 28. The housing 24 is adapted to receive the first and second clamp members 26, 28 in the crimpable state and to secure the clamp members 26, 28 in the crimped state.

The termination 22 includes a ferrule 30 and a crimping member 32. As shown, the ferrule 30 has a central longitudinal passageway 34 and a radially extending notch 36, exposing the central passageway 34. A stub optical fiber 38 extends from a termination end 40 to a point visible through the notch 36. During assembly of the termination 22, an index-matching gel (not shown) is applied to the stub fiber 38, through the notch 36, to effectively couple the optical fiber 12 to the stub fiber 38. Excess gel is then removed from the notch 36.

The housing 24 has a ferrule end 42 and a cable end 44. The ferrule end 42 defines a substantially cylindrical ferrule channel 46, terminating at an annular ferrule stop wall 48, adapted to receive and frictionally retain the ferrule 30. The cable end 44 defines a substantially cylindrical cable channel 50 adapted to receive the optical fiber 12 and buffer jacket 20. The cable end 44 has an external knurled surface 52 to facilitate connection of the fiber optic cable 14 to the crimpable housing 24. More particularly, the crimping member 32 affixes the strengthening members 18 to the knurled surface 52 of the cable end 44 to substantially avoid undue loading of the optical fiber 12.

The housing 24 further defines a substantially cylindrical clamp channel 54, interposed the ferrule channel 46 and cable channel 50. As best shown in FIG. 2, the diameter of the clamp channel 54 is less than the diameter of the ferrule channel 46 and greater than the diameter of the cable channel 50, so as to provide a clamp stop wall 56. The channels 46, 50, 54 are substantially coaxial, such that the housing 24 has a central longitudinal axis, designated "A" in FIG. 3.

The housing 24 includes a radially extending collar 58, encompassing the clamp channel 54 substantially adjacent the ferrule stop wall 48. The collar 58 facilitates assembly of the termination 22.

The housing 24 is designed to be crimped in the region of the clamp channel 54 near the collar 58, designated "B" in FIG. 2. A conventional crimping tool (not shown) is used to crimp both the housing 24 and crimping member 32.

Referring now to FIGS. 2, 3, 5 and 6, the first clamp member 26 is substantially semi-cylindrical, having a first entrance end 60 and a first exit end 62. The first clamp member 26 has a longitudinally extending, substantially planar central region 64. A groove 66 extends longitudinally at the center of the planar region 64. The first clamp member 26 has opposed, rounded ridges 68, 70, respectively, extending along the longitudinal edges thereof. The rounded ridges 68, 70 border the central planar region 64 and define a clamp seat 72 therebetween.

The groove 66 is preferably V-shaped, with the walls thereof forming substantially a right angle. The depth is preferably about 0.0035 inches.

In the crimpable state, the first clamp member 26 is positioned within the clamp channel 54, abutting the clamp stop wall 56. In this state, as well as the crimped state, the groove 66 substantially aligns with the central longitudinal axis "A" of the housing 24.

The second clamp member 28 is generally rectangular in shape. In this preferred embodiment, two corners 74, 76 are rounded to facilitate assembly of the termination 22. The second clamp member 28 has a second entrance end 78 and a second exit end 80. The lengths of the first and second clamp members 26, 28 are substantially equivalent, such that the first and second entrance ends 60, 78 and the first and second exit ends 62, 80 substantially align in the crimpable and crimped states.

The first and second entrance ends 60, 78 have first and second, central entrance chamfers 82, 84, respectively. The chamfers 82, 84 cooperatively provide a substantially conical clamp port, generally designated 86, tapering toward the longitudinal groove 66. As such, the first and second clamp members 26, 28 cooperatively define guide means, generally designated 88, for directing the optical fiber 12 towards and at least partially into the groove 66 during assembly.

With reference to FIG. 4, the second clamp member 28 further includes a central exit chamfer 90. When the member 28 rests within the clamp seat 72, the chamfer 90 is substantially opposite and tapers towards the groove 66 in the first clamp member 26.

The optical fiber 12 extends between the first and second clamp members 26, 28 and beyond the first and second exit ends 62, 80, residing at least partially within the longitudinal groove 66. The extension of the fiber 12, beyond the exit ends 62, 80, is routed into the passageway 34 of the ferrule 30, engaging the stud fiber 38. To facilitate such routing, the ferrule 30 includes a substantially conical ferrule entrance port 92.

The housing 24 is crimped, as noted, to clamp or secure the optical fiber 12. During the crimping action, relative movement, or shifting, of the first and second clamp members 26, 28 occurs, as the second clamp member 28 is urged against the optical fiber 12 and towards the clamp seat 72. This interaction exerts a bending force upon the optical fiber 12, tending to draw the fiber 12 away from the stub fiber 38. The exit chamfer 90 substantially avoids bending of the optical fiber 12 during the crimping process. Once crimped, the optical fiber is secured within the termination 22 to a load in excess of one pound.

The first and second clamp members 26, 28 are an injection-molded, impact resistant thermoplastic. A preferred material is polyetherimide.

A preferred embodiment of the present invention has been described herein. It is to be understood that modifications and changes can be made without departing from the true scope and spirit of the present invention, as defined by the following claims which are to be interpreted in view of the foregoing.

I claim:

1. A clamping mechanism, having a crimpable state and a crimped state, for an optical fiber comprising, in combination:

a crimpable housing;

a first clamp member, having a first entrance end and a first exit end, received by said crimpable housing in said crimpable state, said first clamp member defining a substantially central longitudinal groove and a clamp seat;

said first clamp member having no exit chamfer at said first exit end; and a second clamp member, having a second entrance end and a second exit end, received by said crimpable housing and said clamp seat in said crimpable state;

said second clamp member having an exit chamfer at said second exit end, substantially opposite said substantially central longitudinal groove in said crimpable state;

said optical fiber extending between said first and second clamp members and beyond said first and second exit ends and residing at least partially within said substantially central longitudinal groove in said crimped state;

said crimpable housing urging said second clamp member towards said clamp seat in said crimped state to clamp said optical fiber.

2. A clamp mechanism as claimed in claim 1 wherein said first and second clamp members cooperatively define guide means for directing said optical fiber towards said substantially central longitudinal groove.

3. A clamp mechanism as claimed in claim 2 wherein said guide means includes a first entrance chamfer at said first entrance end and a second entrance chamfer at said second entrance end.

4. A clamp mechanism as claimed in claim 1 wherein said first clamp member is substantially semi-cylindrical.

5. A clamp mechanism as claimed in claim 4 wherein said first clamp member has opposed, rounded longitudinal ridges at least partially defining said clamp seat.

6. A clamp mechanism as claimed in claim 1 wherein said first and second clamp members are polyetherimide.

7. A clamping mechanism for an optical fiber comprising, in combination:

a crimpable housing; and a plurality of clamp members, each of said plurality of clamp members having an entrance end and an exit end, received by said crimpable housing, one of said plurality of clamp members defining a substantially central longitudinal groove and a clamp seat, wherein at least one of said plurality of clamp members has an exit chamfer at its exit end, and at least one of said plurality of clamp members has no exit chamfer at its exit end;

said optical fiber extending between said plurality of clamp members and beyond said exit ends and residing at least partially within said substantially central longitudinal groove.

8. A clamp mechanism as claimed in claim 7 wherein said plurality of clamp members cooperatively define guide means for directing said optical fiber toward said substantially central longitudinal groove.

9. A clamp mechanism as claimed in claim 7 wherein each of said plurality of clamp members is substantially semi-cylindrical.

10. A clamp mechanism as claimed in claim 7 wherein each of said plurality of clamp members is polyetherimide.

\* \* \* \* \*

UNITED STATES PATENT AND TRADEMARK OFFICE
CERTIFICATE OF CORRECTION

PATENT NO. : 6,422,764 B1  Page 1 of 1
DATED : July 23, 2002
INVENTOR(S) : Samuel M. Marrs It is certified that error appears in the above-identified patent and that said Letters Patent is hereby corrected as shown below:

<u>Title page,</u>
Item [75], Inventor, "Phillip J. Irwin, Tinley Park, IL (US)" was omitted; and <u>Column 3,</u>
Line 36, the paragraph "As best shown in FIGURES 3 and 5, the second clamp member 28 is received by the crimpable housing 24. In the crimpable state, the clamp member 28 generally rests in the clamp seat 72 against the clamp stop wall 56." was omitted.

Signed and Sealed this

Twenty-fifth Day of March, 2003

JAMES E. ROGAN
*Director of the United States Patent and Trademark Office*